United States Patent
Lian et al.

(10) Patent No.: US 9,633,029 B2
(45) Date of Patent: Apr. 25, 2017

(54) METHOD, SERVER, AND USER TERMINAL FOR PROVIDING AND ACQUIRING MEDIA CONTENT

(71) Applicant: Huawei Technologies Co., Ltd., Shenzhen (CN)

(72) Inventors: Shiguo Lian, Beijing (CN); Xin Wang, Santa Clara, CA (US); Yongliang Liu, Beijing (CN); Shaobo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 554 days.

(21) Appl. No.: 14/311,631

(22) Filed: Jun. 23, 2014

(65) Prior Publication Data
US 2014/0304297 A1 Oct. 9, 2014

Related U.S. Application Data

(63) Continuation of application No. PCT/CN2012/087524, filed on Dec. 26, 2012.

(30) Foreign Application Priority Data

Dec. 31, 2011 (CN) .......................... 2011 1 0459431

(51) Int. Cl.
*G06F 17/30* (2006.01)
*H04L 29/06* (2006.01)
(Continued)

(52) U.S. Cl.
CPC .. *G06F 17/30106* (2013.01); *G06F 17/30017* (2013.01); *G06F 17/30283* (2013.01);
(Continued)

(58) Field of Classification Search
CPC ......... G06F 17/30017; G06F 17/30283; G06F 17/30864
(Continued)

(56) References Cited

U.S. PATENT DOCUMENTS 5,584,006 A * 12/1996 Reber ............... G06F 17/30014
360/13
8,165,343 B1 * 4/2012 McGowan ......... H04N 21/8358
348/461
(Continued)

FOREIGN PATENT DOCUMENTS

CN      1060750 A     4/1992
CN      1859084 A     11/2006
(Continued)

OTHER PUBLICATIONS

Partial English Translation and Abstract of Chinese Patent Application No. CN102143129, Part 1, Jul. 29, 2014, 26 pages.
(Continued)

*Primary Examiner* — Sangwoo Ahn
(74) *Attorney, Agent, or Firm* — Conley Rose, P.C.

(57) ABSTRACT

A method, a server, and a user terminal for providing and acquiring media content are provided. The providing method includes: receiving a file segment acquiring request sent by a user terminal, where the file segment acquiring request is generated and sent by the user terminal according to an identifier of the user terminal, and the media segment description file includes a storage address and an embedded identifier of each media file segment that is divided from media content; and providing the user terminal with a media file segment that is embedded with the identifier of the user terminal. In the technical solution of the present invention, a server no longer processes media content in real time and responds to an acquiring request of a user terminal, thereby
(Continued)

reducing concurrent load of the server and reducing concurrent bandwidth occupied by media content distribution.

14 Claims, 12 Drawing Sheets

(51) Int. Cl.
*G06F 21/10* (2013.01)
*H04L 29/08* (2006.01)
*H04N 21/258* (2011.01)
*H04N 21/426* (2011.01)
*H04N 21/6332* (2011.01)
*H04N 21/84* (2011.01)
*H04N 21/845* (2011.01)

(52) U.S. Cl.
CPC ........ *G06F 17/30864* (2013.01); *G06F 21/10* (2013.01); *H04L 65/4084* (2013.01); *H04L 67/06* (2013.01); *H04N 21/25816* (2013.01); *H04N 21/42684* (2013.01); *H04N 21/6332* (2013.01); *H04N 21/84* (2013.01); *H04N 21/8456* (2013.01)

(58) Field of Classification Search
USPC .......................................... 707/769, 694, 736
See application file for complete search history.

(56) References Cited

U.S. PATENT DOCUMENTS

| | | | |
|---|---|---|---|
| 2002/0184307 A1* | 12/2002 | Pineau | G06F 3/1292 709/203 |
| 2003/0204602 A1 | 10/2003 | Hudson et al. | |
| 2004/0117829 A1 | 6/2004 | Karaoguz et al. | |
| 2006/0230111 A1* | 10/2006 | Andersen | H04L 29/12113 709/205 |
| 2007/0043667 A1 | 2/2007 | Qawami et al. | |
| 2007/0077921 A1 | 4/2007 | Hayashi et al. | |
| 2007/0118873 A1 | 5/2007 | Houh et al. | |
| 2008/0063195 A1 | 3/2008 | Li | |
| 2011/0320626 A1* | 12/2011 | Wong | H04N 21/41407 709/231 |

FOREIGN PATENT DOCUMENTS

| | | |
|---|---|---|
| CN | 101222509 A | 7/2008 |
| CN | 101278311 A | 10/2008 |
| CN | 101350918 A | 1/2009 |
| CN | 101645927 A | 2/2010 |
| CN | 102143129 A | 8/2011 |
| CN | 102571950 A | 7/2012 |
| EP | 2079033 A1 | 7/2009 |
| JP | 2011028724 A | 2/2011 |
| WO | 03024020 A1 | 3/2003 |

OTHER PUBLICATIONS

Partial English Translation and Abstract of Chinese Patent Application No. CN102143129, Part 2, Jul. 29, 2014, 8 pages.
Partial English Translation and Abstract of Japanese Patent Application No. JP2011028724A, Sep. 8, 2014, 28 pages.
Nakayama, H., et al., "Network-Based Traitor-Tracing Technique Using Traffic Pattern," IEEE Transactions on Information Forensics and Security, vol. 5, No. 2, Jun. 2010, pp. 300-313.
Lian, S., et al., "Commutative Encryption and Watermarking in Video Compression," IEEE Transactions on Circuits and Systems for Video Technology, vol. 17, No. 6, Jun. 2007, pp. 774-778.
Lian, S., et al., "Collusion-Traceable Secure Multimedia Distribution Based on Controllable Modulation," IEE Transactions on Circuits and Systems for Video Technology, vol. 18, No. 10, Oct. 2008, pp. 1462-1467.
Wang, J., et al., "Locally Optimum detection for Barni's Multiplicative Watermarking in DWT domain," Elsevier, Science Direct, Signal Processing 88, 2008, pp. 117-130.
Foreign Communication From A Counterpart Application, PCT Application No. PCT/CN2012/087524, International Search Report dated Apr. 18, 2013, 6 pages.
Foreign Communication From A Counterpart Application, Chinese Application No. 201110459431.0, Chinese Office Action dated Mar. 5, 2014, 41 pages.
Foreign Communication From A Counterpart Application, European Application No. 12862466.5, Extended European Search Report dated Jul. 29, 2014, 6 pages.

* cited by examiner

```
Media segment description file code
Media Copy 0:
 Segment 0:
  Identification Code #0: '001'
  Segment HTTP file address: 'http://www.server1.com/segment_0_0.avi'
 End
 Segment 1:
 ...
 Segment n-1:
  Identification Code #n-1: '001'
  Segment HTTP file address: 'http://www.server5.com/segment_0_n_1.avi'
 End
End Media Copy 1:
 Segment 0:
  Identification Code #0: '010'
  Segment HTTP file address: 'http://www.server1.com/segment_1_0.avi'
 End
 Segment 1:
 ...
 Segment n-1:
  Identification Code #n-1: '010'
  Segment HTTP file address: 'http://www.server5.com/segment_1_n_1.avi'
 End
End Media Copy 2:
...
```

FIG. 2B

METHOD, SERVER, AND USER TERMINAL FOR PROVIDING AND ACQUIRING MEDIA CONTENT

CROSS-REFERENCE TO RELATED APPLICATIONS

This application is a continuation of International Application No. PCT/CN2012/087524, filed on Dec. 26, 2012, which claims priority to Chinese Patent Application No. 201110459431.0, filed on Dec. 31, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to network communications technologies, and in particular, to a method, a server, and a user terminal for providing and acquiring media content.

BACKGROUND

During media distribution, for example, television reception based on a set-top box, online Internet television watching based on a browser, music download based on a mobile device, and media copying and distribution based on a digital versatile disc (DVD), a media content recipient who has paid fees may illegally distribute received media content to an unauthorized user or directly share the received media content on the Internet. These malicious distribution behaviors are piracy behaviors.

An existing pirate tracking technology aims at tracking a malicious distributor. In the prior art, a media server acquires a unique identifier of a user terminal according to a request of the user terminal for downloading or online consumption of media content, embeds the identifier of the user terminal in the media content, and then encrypts the media content and provides it for the user terminal. When the media content is found maliciously distributed, the server identifies the malicious distributor of the media content by detecting the identifier in the media content.

However, the server needs to process the media content in real time, respond to requests of all user terminals, and generate and distribute, for each terminal, a copy of the media content that carries a respective identifier. Therefore, concurrent load of the server is very high, and concurrent bandwidth occupied by media content distribution is also high.

SUMMARY

The present invention provides a method, a server, and a user terminal for providing and acquiring media content, so as to reduce concurrent load of a server and reduce concurrent bandwidth resources occupied by media content distribution.

One aspect of the present invention provides a method for providing media content, where the method includes: receiving a file segment acquiring request sent by a user terminal, where the file segment acquiring request is generated and sent by the user terminal according to an identifier of the user terminal and a media segment description file that is acquired in advance, and the media segment description file includes a storage address and an embedded identifier of each media file segment that is divided from media content; and providing the user terminal with the media file segment that corresponds to the file segment acquiring request and is embedded with the identifier of the user terminal.

One aspect of the present invention further provides a server, where the server includes: an acquiring request receiving module configured to receive a file segment acquiring request sent by a user terminal, where the file segment acquiring request is generated and sent by the user terminal according to an identifier of the user terminal and a media segment description file that is acquired in advance, and the media segment description file includes a storage address and an embedded identifier of each media file segment that is divided from media content; and a media providing module configured to provide the user terminal with the media file segment that corresponds to the file segment acquiring request and is embedded with the identifier of the user terminal.

Another aspect of the present invention provides a method for acquiring media content, where the method includes: generating, by a user terminal, a file segment acquiring request according to a media segment description file acquired in advance and an identifier of the user terminal, where the media segment description file includes a storage address and an embedded identifier of each media file segment that is divided from media content; sending, by the user terminal, the file segment acquiring request to a server, so as to request acquiring of the media file segment corresponding to the file segment acquiring request; and acquiring, by the user terminal from the server, the media file segment that corresponds to the file segment acquiring request and is embedded with the identifier of the user terminal.

Another aspect of the present invention further provides a user terminal, where the user terminal includes: an acquiring request generating module configured to generate, according to a media segment description file acquired in advance and an identifier of the user terminal, a file segment acquiring request, where the media segment description file includes a storage address and an embedded identifier of each media file segment that is divided from media content; an acquiring request sending module configured to send the file segment acquiring request to a server, so as to request acquiring of the media file segment corresponding to the file segment acquiring request; and a media file acquiring module configured to acquire, from the server, the media file segment that corresponds to the file segment acquiring request and is embedded with the identifier of the user terminal.

In the method and the server for providing media content according to one aspect of the present invention, after receiving an acquiring request of a user terminal, the server provides, according to the acquiring request, the user terminal with a media file segment that is made in advance and is embedded with the identifier of the user terminal, and the server no longer processes media content in real time and responds to the acquiring request of the user terminal, thereby reducing concurrent load of the server and reducing concurrent bandwidth occupied by media content distribution.

In the method and the user terminal for acquiring media content according to another aspect of the present invention, the user terminal acquires, according to its identifier and an identifier that is embedded into each media file segment in a media segment description file acquired in advance, a media file segment that needs to be acquired, sends an acquiring request to a server according to a storage address of each media file segment in the media segment description file, and then acquires, from the server, the corresponding media file segment embedded with the identifier of the user terminal. The server does not need to process media content in real time or distribute the media content according to the request of the user terminal; therefore, for the server, its concurrent load is reduced; and for the user terminal, the server can immediately respond upon receiving of the request, thereby improving a rate of acquiring the media file segment by the user terminal.

BRIEF DESCRIPTION OF THE DRAWINGS

To describe the technical solutions in the embodiments of the present invention or in the prior art more clearly, the following briefly introduces accompanying drawings required for describing the embodiments or the prior art. The accompanying drawings in the following description show some embodiments of the present invention, and persons of ordinary skill in the art may still derive other drawings according to these accompanying drawings without creative efforts.

FIG. 2B is a structure of a media segment description file denoted by code according to another embodiment of the present invention;

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. The embodiments to be described are a part rather than all of the embodiments of the present invention. All other embodiments obtained by persons of ordinary skill in the art based on the embodiments of the present invention without creative efforts shall fall within the protection scope of the present invention.

Figure 1:
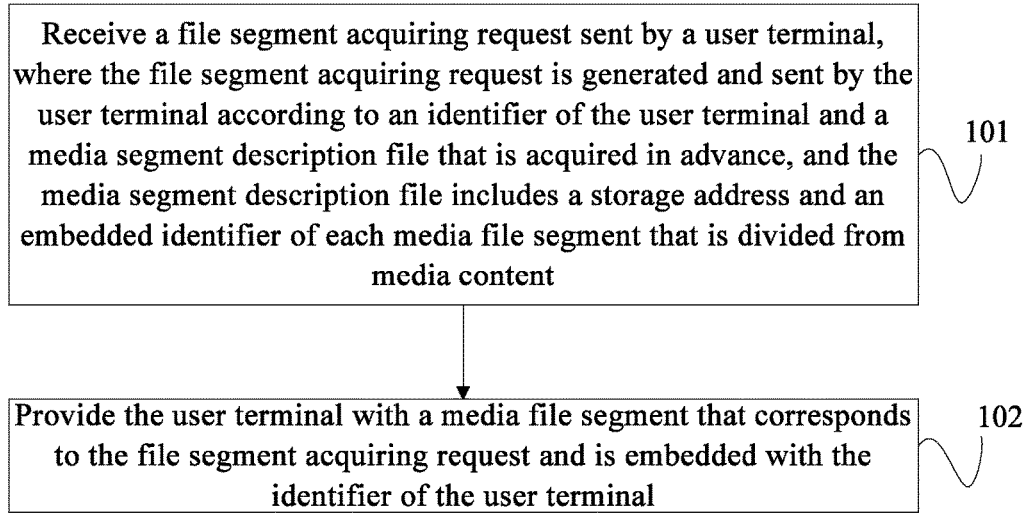
FIG. 1 is a flowchart of a method for providing media content according to an embodiment of the present invention.

FIG. 1 is a flowchart of a method for providing media content according to an embodiment of the present invention. As shown in FIG. 1, the method in this embodiment includes:

Step 101: Receive a file segment acquiring request sent by a user terminal, where the file segment acquiring request is generated and sent by the user terminal according to an identifier of the user terminal and a media segment description file that is acquired in advance, and the media segment description file includes a storage address and an embedded identifier of each media file segment that is divided from media content.

In this embodiment, a server performs processing such as segmenting, backup, and identifier embedding for the media content in advance, stores each segment, into which an identifier is embedded, as an independent file (that is, a media file segment) while performing the processing such as segmenting, backup, and identifier embedding for the media content, and generates a media segment description file (MSDF). The media segment description file indicates an identifier corresponding to each media file segment (that is, the identifier embedded into the media file segment) and a storage address of the media file segment.

Before this step, the server sends the media segment description file to the user terminal in advance. To ensure security of the media segment description file during transmission, the server may encrypt the media segment description file before sending the media segment description file.

The user terminal selects, by comparing its identifier with an identifier that is embedded into each media file segment and provided by the media segment description file, a media file segment that needs to be acquired, and then sends, according to the storage address of the selected media file segment, a request for acquiring the media file segment to a server storing the media file segment that needs to be acquired. The storage address of the selected media file segment may not only point to the server that stores the media file segments, but also point to a specific storage locations of the media file segments on the server. The "media file segment that needs to be acquired" refers to a media file segment that the user terminal has permission to download, for example, it may be a media file segment with an embedded identifier that is the same as the identifier of the user terminal itself.

Accordingly, the server may receive the file segment acquiring request sent by the user terminal.

Step 102: Provide the user terminal with the media file segment that corresponds to the file segment acquiring request and is embedded with the identifier of the user terminal.

After receiving the file segment acquiring request of the user terminal, the server identifies, according to the file segment acquiring request, that the user terminal needs to acquire a media file segment stored on the server.

Then the server provides the user terminal with the stored media file segment. A manner for the server to provide the user terminal with the media file segment may be as follows: the server sends the acquired media file segment to the user terminal. It may also be as follows: the server allows the user terminal to download the media file segment from the server in a HyperText Transfer Protocol (HTTP) manner.

In this embodiment, a server forms and stores in advance a media file segment embedded with an identifier, and after receiving an acquiring request of a user terminal, directly provides the user terminal with the stored media file segment according to the acquiring request. Compared with the prior art, when receiving a request of a user terminal, the server no longer performs real-time processing such as identifier embedding for media content and no longer generates a corresponding media content copy for each user terminal in real time, which relieves processing burden of the server and improves efficiency of the user terminal in obtaining the media content. In addition, the server performs media content distribution according to the request of the user terminal instead of proactively and simultaneously performing distribution to all user terminals, which greatly reduces concurrent load of the server and reduces concurrent bandwidth occupied by media content distribution.

Figure 2A:
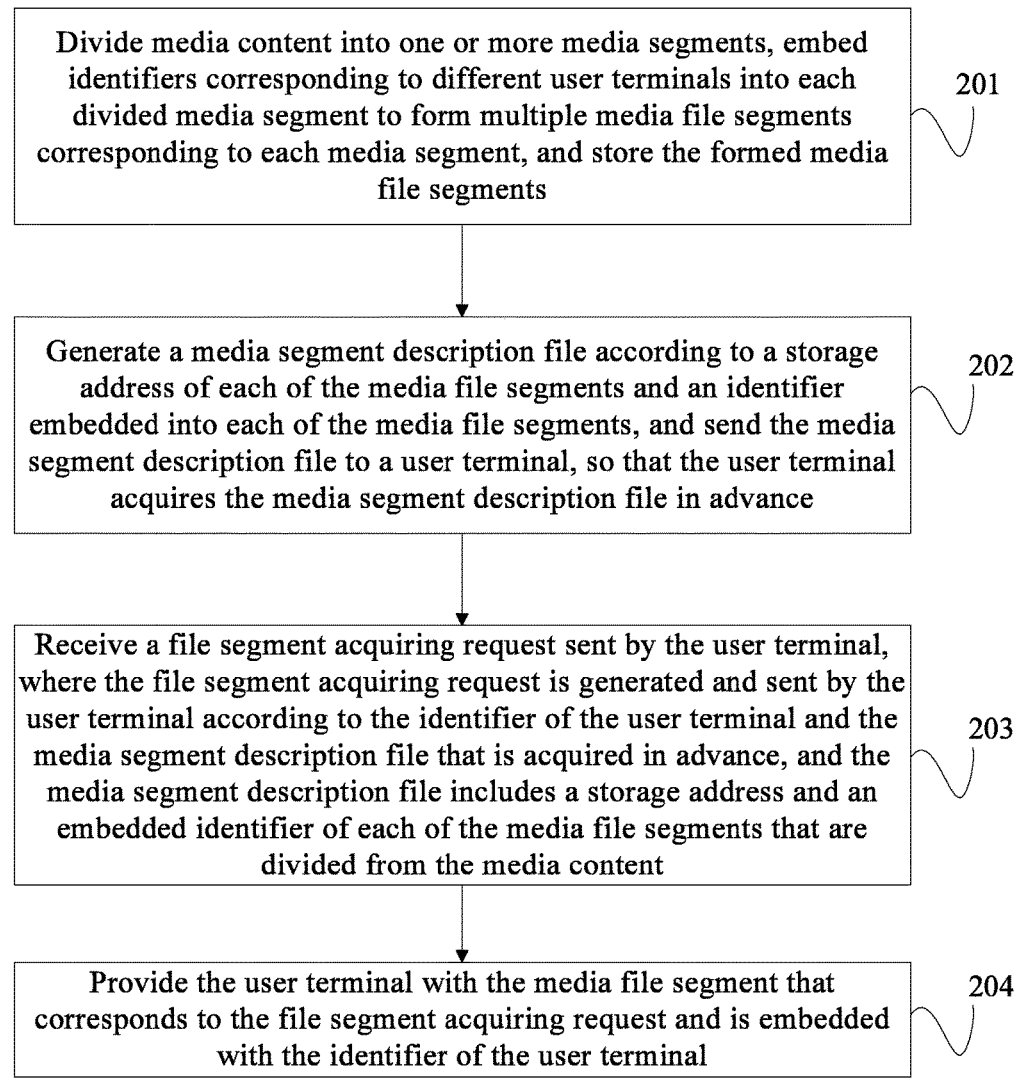
FIG. 2A is a flowchart of a method for providing media content according to another embodiment of the present invention.

FIG. 2A is a flowchart of a method for providing media content according to another embodiment of the present invention. As shown in FIG. 2A, the method in this embodiment includes:

Step 201: Divide media content into one or more media segments, embed identifiers corresponding to different user terminals into each divided media segment to form multiple media file segments corresponding to each media segment, and store the formed media file segments.

In this embodiment, a server divides the media content into one or more media segments in advance. A division manner used by the server is not limited, for example, the division may be performed according to a size of a media segment. Then the server embeds identifiers of different user terminals into each media segment to form multiple media file segments corresponding to each media segment. This operation aims to form copies (where each copy is a media file segment) corresponding to the different user terminals from one media segment and embed an identifier of each user terminal into the copy corresponding to the user terminal, so as to track a user terminal performing malicious distribution. Then, the server stores each of the media file segments as an independent file. This step is described below by using an example.

First, it is assumed that the server divides the media content into n media segments. Then it is assumed that the server makes m copies for each media segment, that is, the server makes m media file segments by embedding identifiers of m user terminals into each media segment. The first media segment is used as an example. An identifier of the first user terminal is embedded into the first media segment to obtain a media file segment corresponding to the first user terminal; an identifier of the second user terminal is embedded into the first media segment to obtain a media file segment corresponding to the second user terminal; . . . ; and an identifier of the $m^{th}$ user terminal is embedded into the first media segment to obtain a media file segment corresponding to the $m^{th}$ user terminal. In this way, n*m media file segments are formed from n media segments. For the convenience of description, among the n*m media file segments, n media file segments corresponding to n media segments are treated as one group. In this case, the n*m media file segments form m groups. Media file segments in a same group are media file segments corresponding to one user terminal. Media file segments in different groups correspond to different user terminals.

In this embodiment, a same identifier is preferably embedded into all media segments corresponding to a same user terminal, where the identifier is the identifier of the user terminal. For example, if the identifier of the user terminal is "0010", "001010001010" is embedded into all media segments corresponding to the user terminal to obtain multiple media file segments corresponding to the user terminal. If that the media content is divided into n media segments is still used as an example, n media file segments carrying "001010001010" are obtained for the same user terminal.

In addition, different identifiers may also be embedded into each media segment corresponding to a same user terminal, but the identifiers must uniquely identify the user terminal. An exemplary implementation manner is as follows: split the identifier of the user terminal into multiple identifier segments, for example, split "001010001010" into "001", "010", "001", and "010"; and then, embed one split identifier segment into each media segment corresponding to the user terminal, thereby forming multiple media file segments corresponding to the user terminal. That the media content is divided into n media segments is still used as an example. The server may embed "001" into the first media segment to obtain the first media file segment corresponding to the user terminal, embed "010" into the second media segment to obtain the second media file segment corresponding to the user terminal, embed "001" into the third media segment to obtain the third media file segment corresponding to the user terminal, embed "010" into the fourth media segment to obtain the fourth media file segment corresponding to the user terminal, . . . , until the $n^{th}$ media file segment corresponding to the user terminal is obtained.

A manner of splitting an identifier of a user terminal and a manner of embedding an identifier segment into each media segment corresponding to the user terminal are not limited, and the foregoing is merely an example.

A watermark embedding method in the prior art may be used as a method for embedding an identifier, and details are not repeatedly described herein.

Then, the server encrypts the media file segments and stores them in a corresponding location of the server, where different media file segments may be stored in different locations. A storage location of a media file segment may be indicated by an HTTP address. The encryption performed for the media file segments is an optional operation, which can improve security of the media file segments. In addition, different encryption keys may be adopted for multiple media file segments corresponding to a same media segment, and different encryption keys may be adopted for multiple media file segments corresponding to different media segments, so as to further improve the security of the media file segments. A specific encryption method is not limited in this embodiment.

The server generates multiple copies for a media segment, which can increase the number of users that can be identified without affecting service quality.

In this step, the media content is divided into different media segments, which improves flexibility in processing the media content. For example, after being embedded with identifiers of different user terminals, media content of a same media segment may be stored in different locations. For another example, after the media content is segmented, the user terminal is allowed to request acquiring of the media content segment by segment, and the whole media content does not need to be provided for the user terminal when the user terminal sends a request. In this way, if a large number of user terminals request the media content at the same time, concurrent resources occupied by media content distribution are further reduced because multiple copies of the whole media content do not need to be provided for the large number of user terminals at the same time.

Step 202: Generate a media segment description file according to a storage address of each of the media file segments and an identifier embedded into each of the media file segments, and send the media segment description file to a user terminal, so that the user terminal acquires the media segment description file in advance.

After performing the operation in step 201, the server organizes the storage address of each of the media file segments and the identifier embedded into each of the media file segments in a certain organization manner to generate the media segment description file. FIG. 2B shows a structure of the media segment description file denoted by code. As shown in FIG. 2B, code corresponding to each of the media file segments includes an identifier and a storage address that correspond to each of the media file segments. A storage address shown in FIG. 2B is an HTTP address, but it is not limited thereto in practice, for example, it may also be a pointer location of a storage space.

After the media segment description file is formed, the server provides the media segment description file for each user terminal. Different user terminals may receive a same media segment description file. To ensure security, the server can provide the media segment description file for a user terminal in an encryption manner. The server may send the media segment description file to the user terminal in a broadcast, unicast, or multicast manner. In addition, the server may further place the media segment description file on a web page for the user terminal to download.

Step 201 and step 202 mainly describe a process in which the server segments and backs up the media content and embeds an identifier to make multiple copies of each media segment, stores each copy as an independent file, generates the media segment description file, and notifies a user terminal of related information about each copy by means of the media segment description file, so as to lay a foundation for the user terminal to subsequently acquire a media file segment from the server when needed.

Step 203: Receive a file segment acquiring request sent by the user terminal, where the file segment acquiring request is generated and sent by the user terminal according to the identifier of the user terminal and the media segment description file that is acquired in advance, and the media segment description file includes a storage address and an embedded identifier of each of the media file segments that are divided from the media content.

Step 204: Provide the user terminal with the media file segment that corresponds to the file segment acquiring request and is embedded with the identifier of the user terminal.

For step 203 and step 204, reference may be made to the descriptions of step 101 and step 102, and details are not repeatedly described herein.

In this embodiment, a server forms and stores in advance a media file segment embedded with an identifier, and after receiving an acquiring request of a user terminal, directly provides the user terminal with a corresponding media file segment according to the acquiring request. Compared with the prior art, when receiving a request of a user terminal, the server no longer performs real-time processing such as identifier embedding for media content and no longer generates a corresponding media content copy for each user terminal in real time, which relieves processing burden of the server and improves efficiency of the user terminal in obtaining the media content. In addition, the server performs media content distribution according to the request of the user terminal instead of proactively and simultaneously performing distribution to all user terminals, which greatly reduces concurrent load of the server and reduces concurrent bandwidth occupied by media content distribution.

Figure 3:
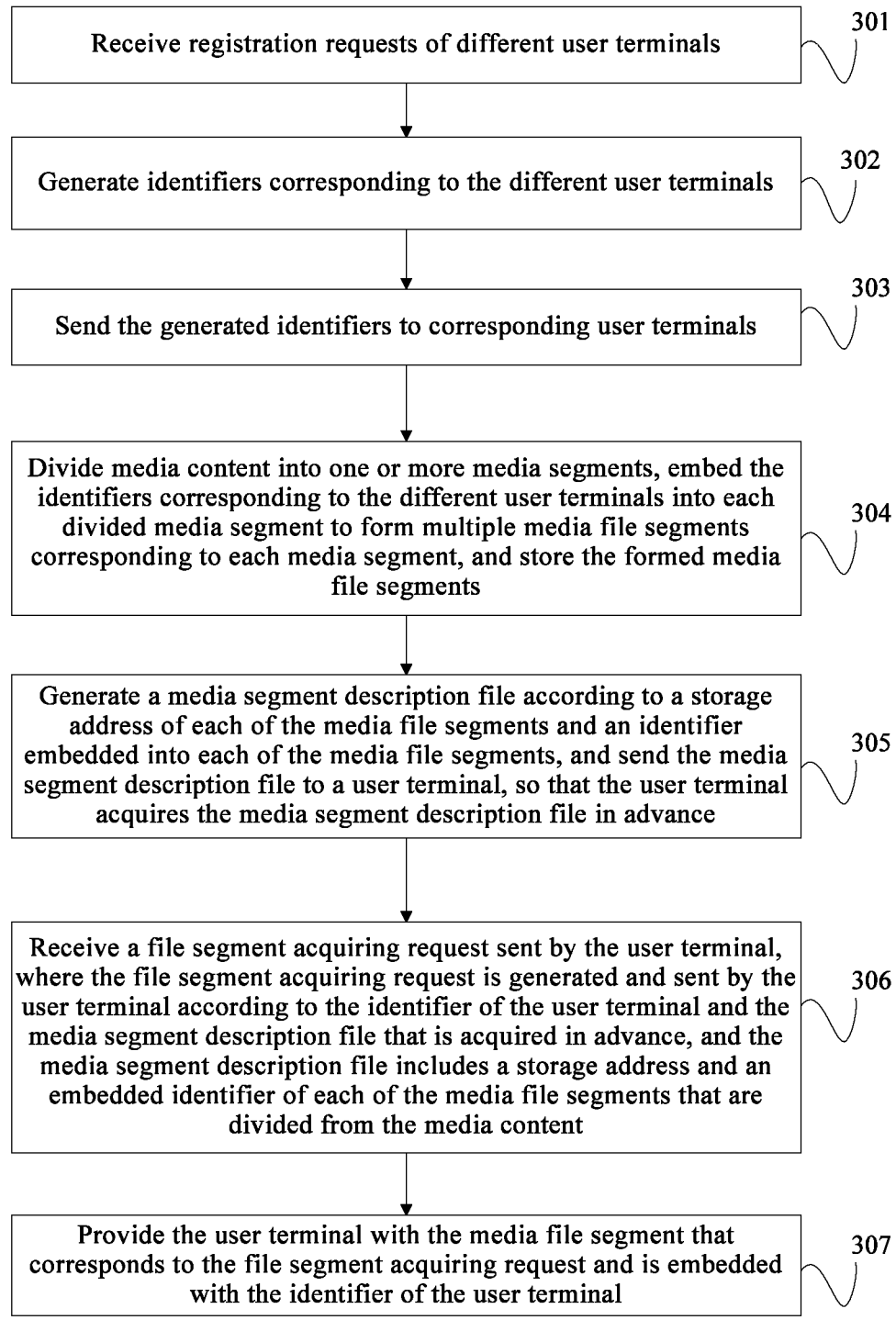
FIG. 3 is a flowchart of a method for providing media content according to still another embodiment of the present invention.

FIG. 3 is a flowchart of a method for providing media content according to another embodiment of the present invention. As shown in FIG. 3, the method in this embodiment includes:

Step 301: Receive registration requests of different user terminals.

In this embodiment, a server may further manage each user terminal. Before requesting acquiring of a media file segment from the server, each user terminal needs to send a registration request to the server first. The registration request includes information that can identify uniqueness of a user terminal, for example, a user name and a password, or the media access control (MAC) address of a network adapter, or other unique hardware identification information.

The server receives the registration requests of the user terminals, and manages the user terminals according to the registration requests.

Step 302: Generate identifiers corresponding to the different user terminals.

In this embodiment, after receiving the registration requests of the user terminals, the server generates identifiers for the user terminals. For example, the server may generate respective identifiers for the different user terminals by using a random number generation method, but it is not limited thereto. In this way, the identifiers of the user terminals may be binary (0/1) sequences, and their length is denoted by L bits. The server may store the generated identifiers.

Step 303: Send the generated identifiers to corresponding user terminals.

After generating the identifiers for the user terminals, the server sends the generated identifiers to the user terminals.

In addition, by means of a registration process of a user terminal, the server may collect statistics on the number of user terminals that need to acquire media file segments, so that the server can know the number of media file segments that need to be generated in advance, and additionally, the server can generate a corresponding media file segment for a user terminal in advance before the user terminal sends a file segment acquiring request.

Step 304: Divide media content into one or more media segments, embed the identifiers corresponding to the different user terminals into each divided media segment to form multiple media file segments corresponding to each media segment, and store the formed media file segments.

In this step, it is assumed that a length of an identifier of a user terminal is L bits. The server may embed an identifier with all L bits into each media segment to generate media file segments carrying the whole identifier. However, not all media file segments are generated by embedding all L bits into a media segment, and the L bits may be divided into K groups, and one group, that is, L/K bits, is embedded into each media segment to form media file segments carrying an identifier segment. In this way, if the media content is divided into n media segments, an identifier needs to be repeatedly embedded into the media content for n/K times.

Step 305: Generate a media segment description file according to a storage address of each of the media file segments and an identifier embedded into each of the media file segments, and send the media segment description file to a user terminal, so that the user terminal acquires the media segment description file in advance.

For other descriptions related to step 304 and step 305, reference may be made to step 201 and step 202, and details are not repeatedly described herein.

Step 306: Receive a file segment acquiring request sent by the user terminal, where the file segment acquiring request is generated and sent by the user terminal according to the identifier of the user terminal and the media segment description file that is acquired in advance, and the media segment description file includes a storage address and an embedded identifier of each of the media file segments that are divided from the media content.

If in step 304, a segment of the identifier, that is, L/K bits, is embedded into each media segment, when the user terminal selects a media file segment according to an identifier embedded into each of the media file segments in the media segment description file, the selection process may be searching for a corresponding media file segment according to the L-bit identifier of the user terminal, and if it is discovered that the L-bit identifier is inconsistent with a length L/K of an identifier embedded into the media file segment, and splitting, by the user terminal, its identifier into K groups to search for corresponding K media file segments. Then the operation is repeated until selection on the n media file segments is completed. Then the user terminal generates, according to the storage location of an acquired media file segment, a file segment acquiring request and sends it to a corresponding server.

Step 307: Provide the user terminal with the media file segment that corresponds to the file segment acquiring request and is embedded with the identifier of the user terminal.

For other descriptions related to step 306 and step 307, reference may be made to step 101 and step 102, and details are not repeatedly described herein.

In this embodiment, a server forms and stores in advance a media file segment embedded with an identifier, and after receiving an acquiring request of a user terminal, directly provides the user terminal with a corresponding media file segment according to the acquiring request. Compared with the prior art, when receiving a request of a user terminal, the server no longer performs real-time processing such as identifier embedding for media content and no longer generates a corresponding media content copy for each user terminal in real time, which relieves processing burden of the server and improves efficiency of the user terminal in obtaining the media content. In addition, the server performs media content distribution according to the request of the user terminal instead of proactively and simultaneously performing distribution to all user terminals, which greatly reduces concurrent load of the server and reduces concurrent bandwidth occupied by media content distribution.

In each of the foregoing embodiments, one server is used as an example for description. To further reduce the load of a server, multiple servers may be used to jointly complete an operation of media content distribution, where one server serves as a central server responsible for generating and sending a media segment description file, and any other server serves as a media server responsible for sending a media file segment. In this way, the load of the central server can be reduced. This technical solution is described in detail in the following embodiment.

Figure 4:
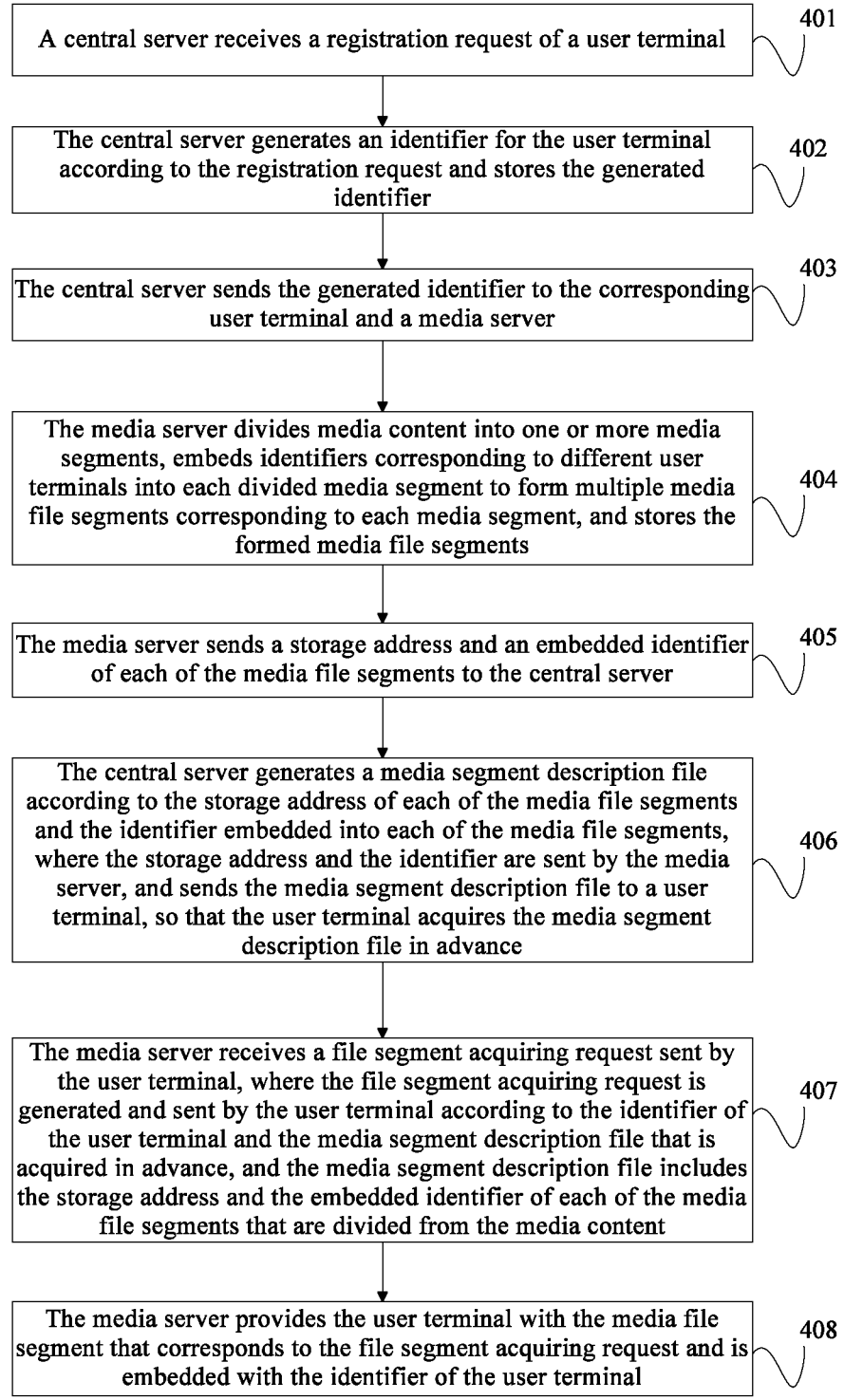
FIG. 4 is a flowchart of a method for providing media content according to yet another embodiment of the present invention.

FIG. 4 is a flowchart of a method for providing media content according to yet another embodiment of the present invention. As shown in FIG. 4, the method in this embodiment includes:

Step 401: A central server receives a registration request of a user terminal.

Step 402: The central server generates an identifier for the user terminal according to the registration request and stores the generated identifier.

Step 403: The central server sends the generated identifier to the corresponding user terminal and a media server.

Step 401 to step 403 are similar to step 301 to step 303, and a difference lies in that in this embodiment, the central server manages the user terminal and the central server needs to provide an identifier of each user terminal for the media server. The same details are not repeatedly described herein.

Step 404: The media server divides media content into one or more media segments, embeds identifiers corresponding to different user terminals into each divided media segment to form multiple media file segments corresponding to each media segment, and stores the formed media file segments.

Step 404 is similar to step 304, and a difference lies in that in this embodiment, the media server forms the media file segments.

Step 405: The media server sends a storage address and an embedded identifier of each of the media file segments to the central server.

In this embodiment, the media server and the central server can communicate with each other. The central server provides the media server with the identifier of a user terminal, and the media server provides the central server with the embedded identifier and storage address of a media file segment after forming the media file segment according to the identifier.

Step 406: The central server generates a media segment description file according to the storage address of each of the media file segments and the identifier embedded into each of the media file segments, where the storage address and the identifier are sent by the media server, and sends the media segment description file to the user terminal, so that the user terminal acquires the media segment description file in advance.

The central server is responsible for aggregating collected information about media file segments to generate the media segment description file, and encrypting and sending the media segment description file to a user terminal. The generated media segment description file includes information such as storage addresses and embedded identifiers of media file segments that are generated by all media servers.

The storage address of each of the media file segments in the media segment description file refers to a storage address of a media file segment on a corresponding media server.

Step 407: The media server receives a file segment acquiring request sent by the user terminal, where the file segment acquiring request is generated and sent by the user terminal according to the identifier of the user terminal and the media segment description file that is acquired in advance, and the media segment description file includes the storage address and the embedded identifier of each of the media file segments that are divided from the media content.

In this embodiment, the user terminal acquires the corresponding media file segment according to an identifier that is embedded into each of the media file segments and provided by the media segment description file, and then sends the file segment acquiring request to a corresponding media server rather than the central server according to a storage address of a corresponding media file segment. For other operations in this step, reference may be made to the description of step 101, and details are not repeatedly described herein.

Step 408: The media server provides the user terminal with the media file segment that corresponds to the file segment acquiring request and is embedded with the identifier of the user terminal.

In this embodiment, multiple media servers assist a central server in completing media content distribution, which further relieves processing burden of the central server and improves efficiency of the media content distribution.

Figure 5:
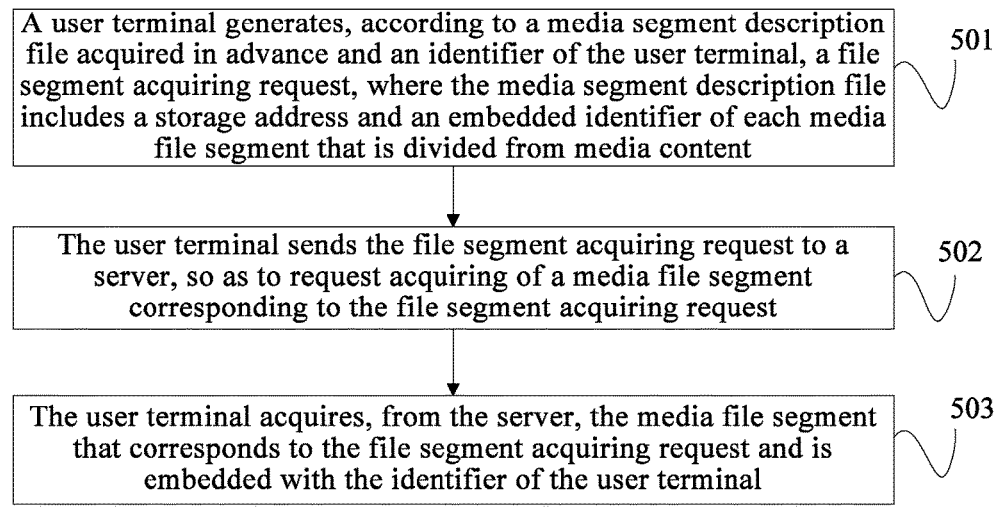
FIG. 5 is a flowchart of a method for acquiring media content according to an embodiment of the present invention.

FIG. 5 is a flowchart of a method for acquiring media content according to an embodiment of the present invention. As shown in FIG. 5, the method in this embodiment includes:

Step 501: A user terminal generates, according to a media segment description file acquired in advance and an identifier of the user terminal, a file segment acquiring request, where the media segment description file includes a storage address and an embedded identifier of each media file segment that is divided from media content.

A media file segment is formed by a server by segmenting media content to form multiple media segments, generating multiple copies for each media segment, and embedding an identifier of one user terminal into each copy. The server may store each generated media file segment as an independent file. Therefore, each media file segment has its corresponding storage address. The server organizes the storage address and the embedded identifier of each media file segment to form the media segment description file. After generating the media segment description file, the server may provide the user terminal with the media segment description file, so that the user terminal acquires the media content according to the media segment description file.

That is, in this embodiment, the user terminal acquires the media segment description file in advance. An identifier embedded into each media file segment is on one hand used to enable each user terminal to identify a media file segment corresponding to the user terminal from all media file segments included in the media segment description file, and on the other hand, facilitates tracking of a malicious distributor.

If the server embeds the identifier of a user terminal into each media file segment, the user terminal may compare its identifier with an identifier embedded into each media file segment in the media segment description file to find a media file segment, which corresponds to an identifier identical with its identifier, in the media segment description file, and further acquire a storage address of this media file segment or storage addresses of these media file segments and generate the file segment acquiring request according to the acquired storage address.

If the server embeds an identifier segment split from the identifier of a user terminal into each media file segment, the user terminal needs to split its identifier into different identifier segments according to a same splitting policy (for example, an identifier whose length is L bits is split into K groups), then matches the split identifier segments with an identifier embedded into each media file segment in the media segment description file one by one to acquire a media file segment, which corresponds to an identifier identical with an identifier segment, in the media segment description file, and further acquires a storage address of this media file segment or storage addresses of these media file segments and generates the file segment acquiring request according to the acquired storage address.

A policy of splitting an identifier of a user terminal and a manner of embedding an identifier segment into each media segment or its copy are not limited.

Step 502: The user terminal sends the file segment acquiring request to the server, so as to request acquiring of the media file segment corresponding to the file segment acquiring request.

The user terminal may find, according to the storage address of the media file segment, a server storing the corresponding media file segment and a specific location of the media file segment on the server. Therefore, after generating the file segment acquiring request, the user terminal may send the file segment acquiring request to the corresponding server, so as to request acquiring of the corresponding media file segment.

After receiving the file segment acquiring request of the user terminal, the server may perform an operation such as authentication for the user terminal to determine whether the user terminal has corresponding permission, and allow the user terminal to acquire the corresponding media file segment if the user terminal has the permission.

Step 503: The user terminal acquires, from the server, the media file segment that corresponds to the file segment acquiring request and is embedded with the identifier of the user terminal.

After obtaining the permission from the server, the user terminal acquires the corresponding media file segment from the server. For example, the user terminal may receive the media file segment that is sent by the server in a broadcast, unicast, or multicast manner. For another example, the user terminal may log in to the server by using an HTTP address and download the media file segment from the server.

In this embodiment, the media file segment acquired by the user terminal from the server is not formed by the server by performing real-time processing for the media content after receiving the file segment acquiring request of the user terminal; instead, it is formed and stored in advance. That is, before the user terminal acquires the media file segment, the media file segment has been embedded with the identifier or an identifier segment of the user terminal and stored in the location identified by the storage address.

In this embodiment, a server generates a media file segment embedded with an identifier or an identifier segment of a user terminal and stores it in advance, so that the user terminal obtains a response immediately after initiating a file segment acquiring request to the server according to a media segment description file, thereby improving a rate of acquiring media content. In addition, the load of the server is reduced because the server does not need to process the media content in real time according to an acquiring request of a user terminal. Instead of proactively and simultaneously performing distribution to all user terminals, the server performs media content distribution according to a request of a user terminal, and only needs to send the media segment description file to each user terminal and provide a user terminal with a media file segment when the user terminal requests the acquiring, thereby greatly reducing concurrent load of the server and reducing concurrent bandwidth occupied by delivery of the media content.

Figure 6:
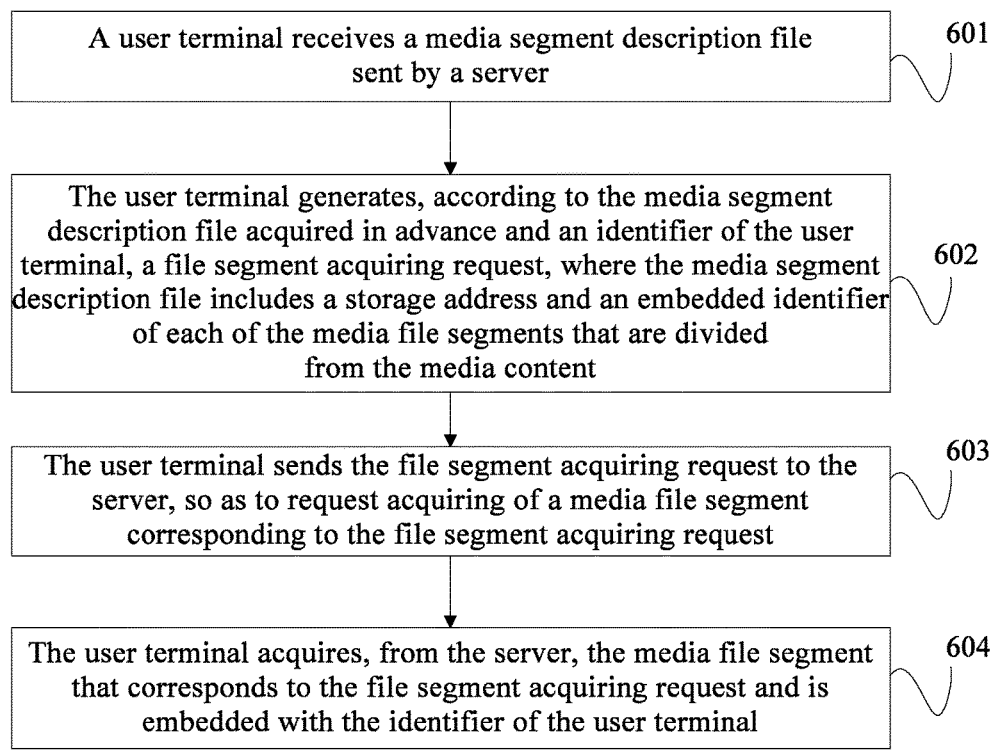
FIG. 6 is a flowchart of a method for acquiring media content according to another embodiment of the present invention.

FIG. 6 is a flowchart of a method for acquiring media content according to another embodiment of the present invention. As shown in FIG. 6, the method in this embodiment includes:

Step 601: A user terminal receives a media segment description file sent by a server.

The media segment description file is generated according to a storage address and an embedded identifier of each media file segment after the server divides media content into one or more media segments, embeds identifiers corresponding to different user terminals into each media segment to form multiple media file segments corresponding to each media segment, and stores the formed media file segments.

That is, the server may perform processing such as segmenting, backup, and identifier embedding for the media content in advance to form media file segments and store the media file segments, and may further organize the storage address and the embedded identifier of each of the media file segments to generate the media segment description file. Then the server may provide the user terminal with the media segment description file.

To ensure security of the media segment description file during transmission, the server may encrypt the media segment description file.

The server may send the encrypted media segment description file to the user terminal in a broadcast, unicast, or multicast manner. Alternatively, the server may provide the user terminal with an HTTP address to allow the user terminal to download the encrypted media segment description file from the server.

If the media segment description file is encrypted, the user terminal decrypts the media segment description file first after acquiring the media segment description file.

Step 602: The user terminal generates, according to the media segment description file acquired in advance and the identifier of the user terminal, a file segment acquiring request, where the media segment description file includes the storage address and the embedded identifier of each of the media file segments that are divided from the media content.

Step 603: The user terminal sends the file segment acquiring request to the server, so as to request acquiring of the media file segment corresponding to the file segment acquiring request.

Step 604: The user terminal acquires, from the server, the media file segment that corresponds to the file segment acquiring request and is embedded with the identifier of the user terminal.

For step 602 to step 604, reference may be made to the descriptions of step 501 to step 503, and details are not repeatedly described herein.

It is noted herein that in this embodiment, the segmenting, backup, identifier embedding, storing, and media segment description file generation performed for the media content are all completed by a same server, and the server is also responsible for receiving a file segment acquiring request of a user terminal and providing the user terminal with a media file segment.

In this embodiment, a server generates a media file segment embedded with an identifier or an identifier segment of a user terminal and stores it in advance, so that the user terminal obtains a response immediately after initiating a file segment acquiring request to the server according to a media segment description file, thereby improving a rate of acquiring media content. In addition, the load of the server is reduced because the server does not need to process the media content in real time according to an acquiring request of a user terminal. Instead of proactively and simultaneously performing distribution to all user terminals, the server performs media content distribution according to a request of a user terminal, and only needs to send the media segment description file to each user terminal and provide a user terminal with a media file segment when the user terminal requests the acquiring, thereby greatly reducing concurrent load of the server and reducing concurrent bandwidth occupied by delivery of the media content.

Figure 7:
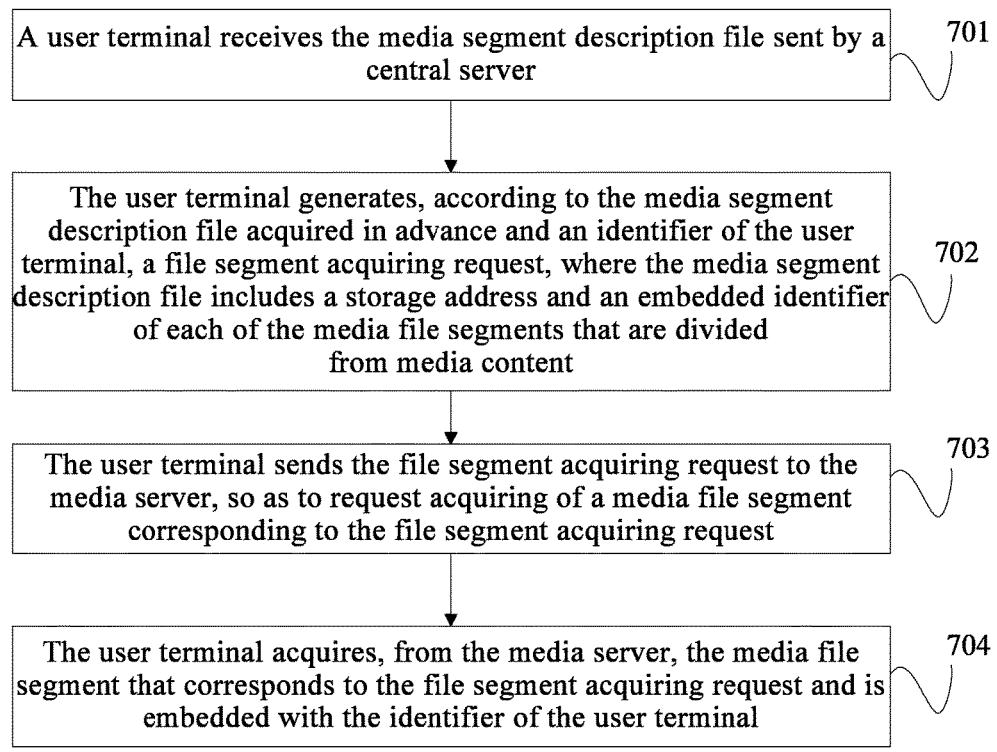
FIG. 7 is a flowchart of a method for acquiring media content according to still another embodiment of the present invention.

FIG. 7 is a flowchart of a method for acquiring media content according to still another embodiment of the present invention. As shown in FIG. 7, the method in this embodiment includes:

Step 701: A user terminal receives a media segment description file sent by a central server.

The media segment description file is generated by the central server according to a storage address and an embedded identifier of each media file segment that are sent by a media server after the media server divides the media content into one or more media segments, embeds identifiers corresponding to different user terminals into each media segment to form multiple media file segments corresponding to each media segment, and stores the formed media file segments.

A difference between step 701 and step 601 lies in that the central server sends the media segment description file to the user terminal. The central server organizes the storage address and the embedded identifier of each of the media file segments, where the storage address and the embedded identifier are provided by the media server, so as to form the media segment description file.

Other operations are similar to those of step 601, and details are not repeatedly described herein.

Step 702: The user terminal generates, according to the media segment description file acquired in advance and the identifier of the user terminal, a file segment acquiring request, where the media segment description file includes the storage address and the embedded identifier of each of the media file segments that are divided from the media content.

For step 702, reference may be made to the description of step 501, and details are not repeatedly described herein.

Step 703: The user terminal sends the file segment acquiring request to the media server, so as to request acquiring of the media file segment corresponding to the file segment acquiring request.

Step 704: The user terminal acquires, from the media server, the media file segment that corresponds to the file segment acquiring request and is embedded with the identifier of the user terminal.

In step 703 and step 704, the user terminal sends the file segment acquiring request to the media server and acquires the corresponding media file segment from the media server.

Other operations are similar to step 502 and step 503, and details are not repeatedly described herein.

In this embodiment, at a server, servers are classified into a central server that is responsible for generating a media segment description file and a media server that processes media content, and the load of the central server is further relieved in this manner.

Figure 8:
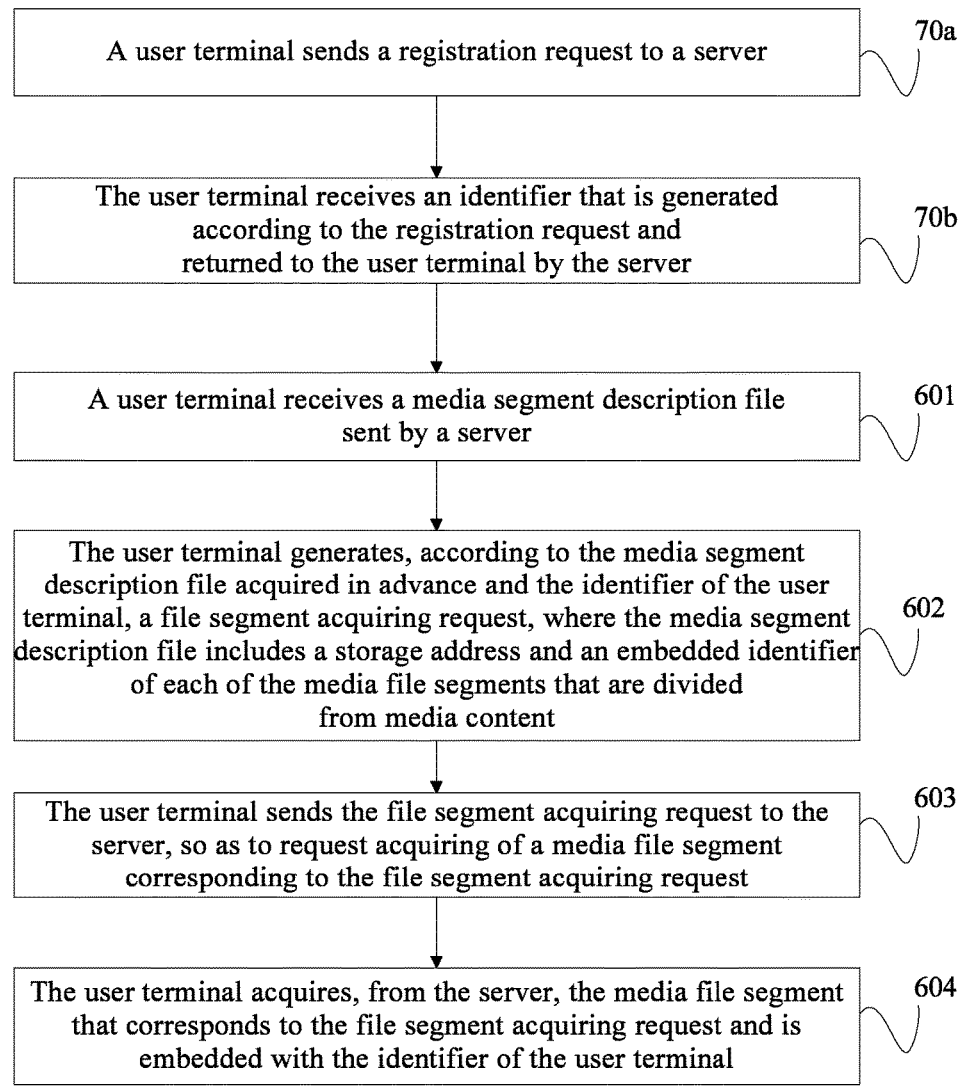
FIG. 8 is a flowchart of a method for acquiring media content according to yet another embodiment of the present invention.

FIG. 8 is a flowchart of a method for acquiring media content according to yet another embodiment of the present invention. This embodiment is implemented based on the embodiment illustrated in FIG. 6. As shown in FIG. 8, the method in this embodiment includes the following steps before step 601:

Step 70a: A user terminal sends a registration request to a server.

Step 70b: The user terminal receives an identifier that is generated according to the registration request and returned to the user terminal by the server.

In this embodiment, the user terminal registers with the server first before requesting acquiring of a media file segment from the server. The server generates the identifier for the user terminal according to the registration request of the user terminal and sends the generated identifier to the user terminal. In addition, the server may further store the identifier of the user terminal, so that the identifier of the user terminal is embedded into a media file segment during subsequent generation of the media file segment corresponding to the user terminal. The user terminal stores the identifier after receiving the identifier provided by the server, so as to find a corresponding media file segment according to the identifier and send a file segment acquiring request to the server.

Further, when a server is classified into a central server and a media server, the user terminal may register with the media server, and the media server generates and returns an identifier for the user terminal. In addition, the user terminal may also register with the central server, so that the central server generates and returns an identifier for the user terminal. However, in this method, the central server also needs to provide the generated identifier for the media server, so that the media server embeds identifiers corresponding to different user terminals into a media segment to form media file segments corresponding to the different user terminals.

In this embodiment, by means of a registration process of a user terminal, the server may collect statistics on the number of user terminals that need to acquire media file segments, so that the server can know the number of media file segments that need to be generated in advance, and additionally, the server can generate a corresponding media file segment for a user terminal in advance before the user terminal sends a file segment acquiring request.

It is noted herein that in each of the foregoing embodiments, if a media file segment needs to be encrypted, to ensure security, a user terminal or a corresponding decryption module in the user terminal may be a hardware device with high security, such as a set-top box, a smart card, a subscriber identity module (SIM) of a mobile phone, and a universal serial bus (USB) key disk, and may also be a software module customized under authorization.

The foregoing embodiments of the present invention are applicable to distribution of multiple types of media content, including video (such as digital television and Internet television), image (such as a medical image), audio (such as Moving Pictures Expert Group Audio Layer III (mp3)), text (such as an e-book), application (such as application software and game), and traceability of distributed content can be implemented.

Figure 9:
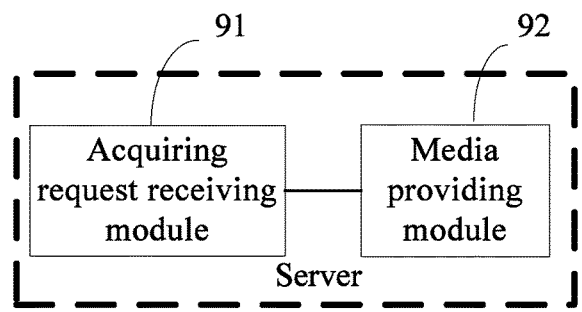
FIG. 9 is a schematic structural diagram of a server according to an embodiment of the present invention.

FIG. 9 is a schematic structural diagram of a server according to an embodiment of the present invention. As shown in FIG. 9, the server in this embodiment includes: an acquiring request receiving module 91 and a media providing module 92.

The acquiring request receiving module 91 is configured to receive a file segment acquiring request sent by a user terminal, where the file segment acquiring request is generated and sent by the user terminal according to an identifier of the user terminal and a media segment description file that is acquired in advance, and the media segment description file includes a storage address and an embedded identifier of each media file segment that is divided from media content. The media providing module 92 is connected to the acquiring request receiving module 91 and is configured to provide the user terminal with a media file segment that corresponds to the file segment acquiring request received by the acquiring request receiving module 91 and is embedded with the identifier of the user terminal.

Each functional module of the server in this embodiment can be used to execute the process of the method for providing media content illustrated in FIG. 1, and their specific working principles are not repeatedly described. For details, reference may be made to the description of the method embodiment.

The server in this embodiment forms and stores in advance a media file segment embedded with an identifier, and after receiving an acquiring request of a user terminal, directly provides the user terminal with the stored media file segment according to the acquiring request. Compared with the prior art, when receiving a request of a user terminal, the server in this embodiment no longer performs real-time processing such as identifier embedding for media content and no longer generates a corresponding media content copy for each user terminal in real time, which relieves processing burden of the server and improves efficiency of the user terminal in obtaining the media content. In addition, the server in this embodiment performs media content distribution according to the request of the user terminal instead of proactively and simultaneously performing distribution to all user terminals, which greatly reduces concurrent load of the server and reduces concurrent bandwidth occupied by media content distribution.

Figure 10:
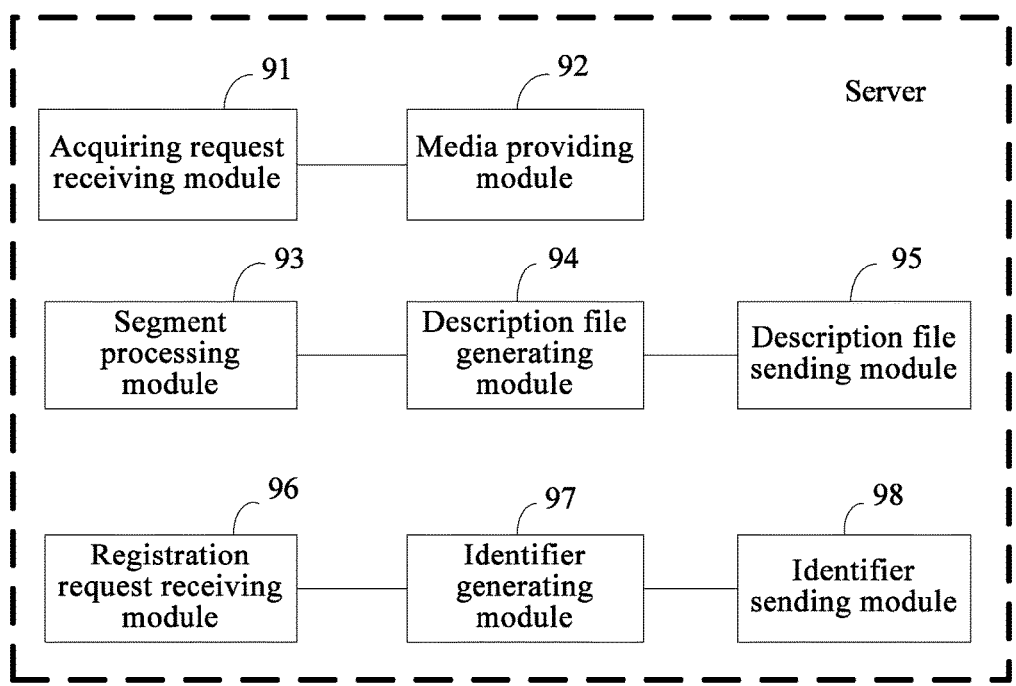
FIG. 10 is a schematic structural diagram of a server according to another embodiment of the present invention.

FIG. 10 is a schematic structural diagram of a server according to another embodiment of the present invention. This embodiment is implemented based on the embodiment illustrated in FIG. 9. As shown in FIG. 10, the server in this embodiment further includes: a segment processing module 93, a description file generating module 94, and a description file sending module 95.

The segment processing module 93 is configured to divide the media content into one or more media segments, embed identifiers corresponding to different user terminals into each divided media segment to form multiple media file segments corresponding to each media segment, and store the formed media file segments before the acquiring request receiving module 91 receives the file segment acquiring request sent by the user terminal. The description file generating module 94 is connected to the segment processing module 93 and is configured to generate a media segment description file according to a storage address of each of the media file segments and an identifier embedded into each of the media file segments. The description file sending module 95 is connected to the description file generating module 94 and is configured to send the media segment description file generated by the description file generating module 94 to the user terminal, so that the user terminal acquires the media segment description file in advance.

The foregoing functional modules can be used to execute the corresponding processes (for example, the processes of step 201 and step 202 in FIG. 2A) in the embodiment illustrated in FIG. 2A or FIG. 3, and their specific working principles are not repeatedly described.

The segment processing module 93 is specifically configured to embed identifiers corresponding to different user terminals into each media segment and embed an identifier corresponding to a same user terminal into all media segments corresponding to the same user terminal to form multiple media file segments corresponding to the same user terminal.

Alternatively, the segment processing module 93 is specifically configured to embed identifiers corresponding to different user terminals into each media segment and embed an identifier segment split from an identifier corresponding to a same user terminal into each media segment corresponding to the same user terminal to form multiple media file segments corresponding to the same user terminal.

Further, the server in this embodiment further includes: a registration request receiving module 96, an identifier generating module 97, and an identifier sending module 98.

The registration request receiving module 96 is configured to receive registration requests of the different user terminals. The identifier generating module 97 is connected to the registration request receiving module 96 and is configured to generate identifiers corresponding to the different user terminals according to the registration requests received by the registration request receiving module 96. The identifier sending module 98 is connected to the identifier generating module 97 and is configured to send the identifiers generated by the identifier generating module 97 to corresponding user terminals.

The identifier generating module 97 may be specifically configured to generate identifiers corresponding to different user terminals by using a random number generation method, but the method is not limited thereto.

Each of the foregoing functional modules can be used to execute the corresponding processes (for example, the process of step 301 to step 303 in FIG. 3) in the embodiment illustrated in FIG. 3 or FIG. 4, and their specific working principles are not repeatedly described.

The server in this embodiment generates and stores in advance, before receiving an acquiring request of a user terminal, media file segments embedded with identifiers of different user terminals, generates a media segment description file and provides it for the user terminal, which lays a foundation for the user terminal to send the acquiring request. In addition, by means of a registration process of a user terminal, the server in this embodiment can collect statistics on the number of user terminals that need to acquire media file segments and learn the number of media file segments that need to be generated in advance, which provides a condition for generating a corresponding media file segment for a user terminal in advance before the user terminal sends a file segment acquiring request.

Figure 11:
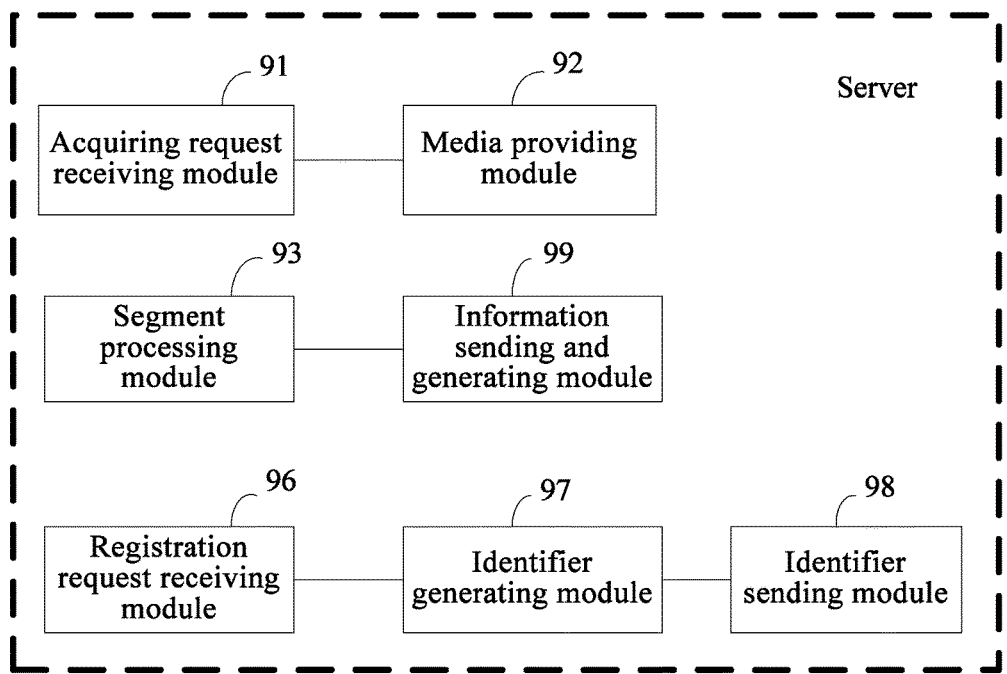
FIG. 11 is a schematic structural diagram of a server according to still another embodiment of the present invention.

Further, when a server includes a central server and a media server, the server in this embodiment may serve as the media server. In this case, the server in this embodiment may have another implementation structure. FIG. 11 is a schematic structural diagram of a server according to still another embodiment of the present invention. This embodiment is implemented based on the embodiment illustrated in FIG. 9. As shown in FIG. 11, the server in this embodiment further includes: a segment processing module 93 and an information sending and generating module 99.

The segment processing module 93 is configured to divide the media content into one or more media segments, embed identifiers corresponding to different user terminals into each divided media segment to form multiple media file segments corresponding to each media segment, and store the formed media file segments. The information sending and generating module 99 is connected to the segment processing module 93 and is configured to send a storage address of each of the media file segments and an identifier embedded into each of the media file segments to the central server, so that the central server generates, according to the storage address of each of the media file segments and the identifier embedded into each of the media file segments, a media segment description file and sends it to the user terminal, so that the user terminal acquires the media segment description file in advance.

Further, the server in this embodiment may further include: a registration request receiving module 96, an identifier generating module 97, and an identifier sending module 98.

For descriptions of the registration request receiving module 96, the identifier generating module 97, and the identifier sending module 98, reference may be made to the description of the embodiment illustrated in FIG. 10, and details are not repeatedly described herein.

The server in this embodiment serves as a media server and provides a central server with an embedded identifier and a storage address of a media file segment after generating and storing the media file segment, so that the central server generates a media segment description file and provides it for a user terminal, thereby reducing the burden of the server in this embodiment and that of the central server.

Figure 12:
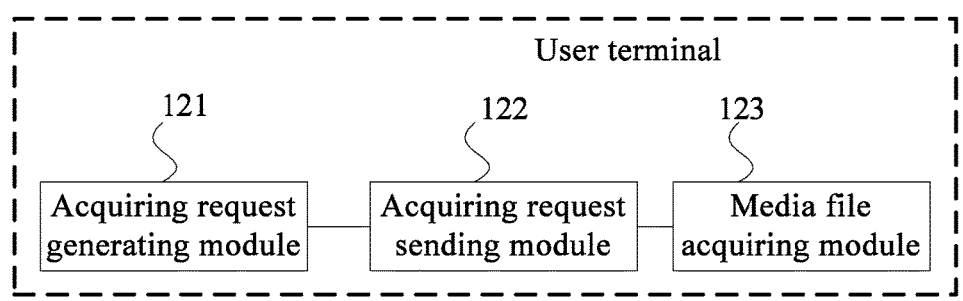
FIG. 12 is a schematic structural diagram of a user terminal according to an embodiment of the present invention.

FIG. 12 is a schematic structural diagram of a user terminal according to an embodiment of the present invention. As shown in FIG. 12, the user terminal in this embodiment includes: an acquiring request generating module 121, an acquiring request sending module 122, and a media file acquiring module 123.

The acquiring request generating module 121 is configured to generate, according to a media segment description file acquired in advance and an identifier of the user terminal, a file segment acquiring request, where the media segment description file includes a storage address and an embedded identifier of each media file segment that is divided from media content. The acquiring request sending module 122 is connected to the acquiring request generating module 121 and is configured to send the file segment acquiring request generated by the acquiring request generating module 121 to a server, so as to request acquiring of the media file segment corresponding to the file segment acquiring request. The media file acquiring module 123 is connected to the acquiring request sending module 122 and is configured to acquire, from the server after the acquiring request sending module 122 sends the file segment acquiring request, the media file segment that corresponds to the file segment acquiring request and is embedded with the identifier of the user terminal.

Each functional module of the user terminal in this embodiment can be used to execute the process of the method for acquiring media content illustrated in FIG. 5, and their specific working principles are not repeatedly described. For details, reference may be made to the description of the method embodiment.

The user terminal in this embodiment can, when working with the server provided in the embodiment of the present invention, immediately obtain a response of the server after initiating a file segment acquiring request according to a media segment description file, which improves a rate of acquiring media content and lays a foundation for reducing load of the server and reducing concurrent resources occupied during media content distribution.

Figure 13:
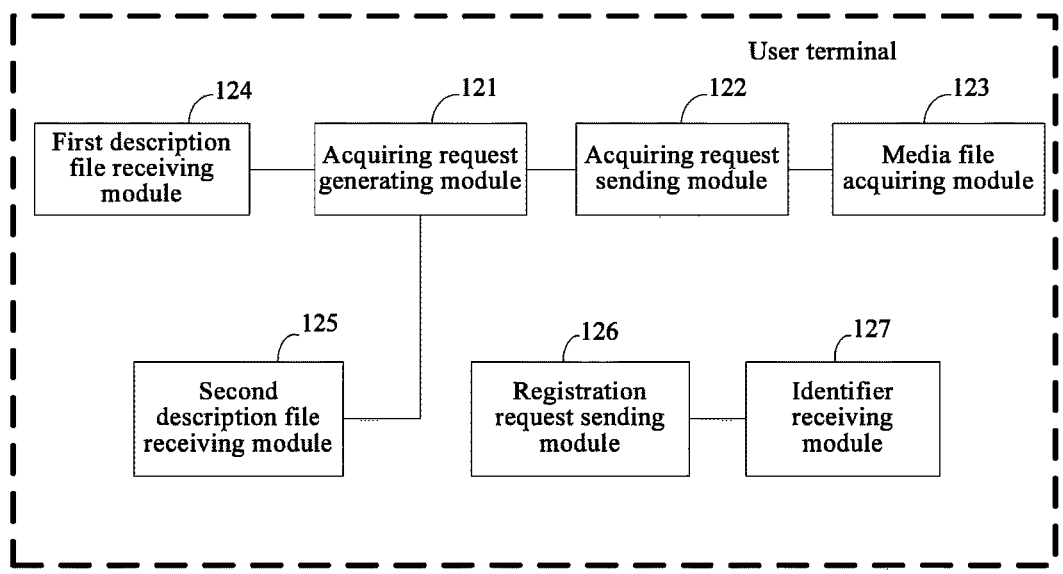
FIG. 13 is a schematic structural diagram of a user terminal according to another embodiment of the present invention.

FIG. 13 is a schematic structural diagram of a user terminal according to another embodiment of the present invention. This embodiment is implemented based on the embodiment illustrated in FIG. 12. As shown in FIG. 13, the user terminal in this embodiment further includes a first description file receiving module 124.

The first description file receiving module 124 is connected to the acquiring request generating module 121 and is configured to receive the media segment description file sent by the server and provide the media segment description file for the acquiring request generating module 121. The media segment description file received by the first description file receiving module 124 is generated according to a storage address and an embedded identifier of each media file segment after the server divides the media content into one or more media segments, embeds identifiers corresponding to different user terminals into each media segment to form multiple media file segments corresponding to each media segment, and stores the formed media file segments.

Further, in a case that a server is classified into a central server and a media server, the user terminal in this embodiment may include a second description file receiving module 125.

The second description file receiving module 125 is connected to the acquiring request generating module 121 and is configured to receive the media segment description file sent by the central server and provide the media segment description file for the acquiring request generating module 121. The media segment description file received by the second description file receiving module 125 is generated by the central server according to a storage address and an embedded identifier of each media file segment that are sent by the media server after the media server divides the media content into one or more media segments, embeds identifiers corresponding to different user terminals into each media segment to form multiple media file segments corresponding to each media segment, and stores the formed media file segments.

Further, the user terminal in this embodiment further includes a registration request sending module 126 and an identifier receiving module 127.

The registration request sending module 126 is configured to send a registration request to the server. The identifier receiving module 127 is connected to the registration request sending module 126 and is configured to receive, after the registration request sending module 126 sends the registration request, an identifier that is generated according to the registration request and returned to the user terminal by the server.

Further, the acquiring request generating module 121 in this embodiment is specifically configured to match the identifier of the user terminal with an identifier embedded into each of the media file segments in the media segment description file, acquire a storage address of a media file segment, which corresponds to an identifier identical with the identifier of the user terminal, in the media segment description file, and generate the file segment acquiring request according to the acquired storage address of the media file segment, which corresponds to the identifier identical with the identifier of the user terminal, in the media segment description file.

Alternatively, the acquiring request generating module 121 is specifically configured to split the identifier of the user terminal into multiple identifier segments, match the identifier segments with an identifier embedded into each of the media file segments in the media segment description file, acquire storage addresses of media file segments, which correspond to identifiers identical with the identifier segments, in the media segment description file, and generate the file segment acquiring request according to the acquired storage addresses of the media file segments, which correspond to the identifiers identical with the identifier segments, in the media segment description file.

Each of the foregoing functional modules can be used to execute the corresponding process in the embodiment illustrated in FIG. 6, FIG. 7, and FIG. 8, and their specific working principles are not repeatedly described. For details, reference may be made to the description of the method embodiment.

The user terminal in this embodiment can, when working with the server provided in the embodiment of the present invention, immediately obtain a response of the server after initiating a file segment acquiring request according to a media segment description file, which improves a rate of acquiring media content and lays a foundation for reducing load of the server and reducing concurrent resources occupied during media content distribution.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for acquiring media content, comprising:
generating, by a user terminal, a file segment acquiring request according to a media segment description file acquired in advance and an identifier of the user terminal, wherein the media segment description file comprises a storage address and an embedded identifier of each media file segment that is divided from media content;
sending, by the user terminal, the file segment acquiring request to a server to request acquiring of the media file segment corresponding to the file segment acquiring request; and
acquiring, by the user terminal from the server, the media file segment that corresponds to the file segment acquiring request and is embedded with the identifier of the user terminal; and
wherein generating, by the user terminal, the file segment acquiring request according to the media segment description file acquired in advance and the identifier of the user terminal comprises:
splitting, by the user terminal, the identifier of the user terminal into multiple identifier segments, matching the identifier segments with the identifier embedded into each of the media file segments in the media segment description file, and acquiring storage addresses of media file segments, which correspond to identifiers identical with the identifier segments, in the media segment description file; and
generating the file segment acquiring request according to the acquired storage addresses of the media file segments, which correspond to the identifiers identical with the identifier segments, in the media segment description file.

2. The method for acquiring media content according to claim 1, wherein generating, by the user terminal, the file segment acquiring request according to the media segment description file acquired in advance and the identifier of the user terminal comprises:

matching, by the user terminal, the identifier of the user terminal with the identifier embedded into each of the media file segments in the media segment description file;

acquiring a storage address of a media file segment, which corresponds to an identifier identical with the identifier of the user terminal, in the media segment description file; and generating the file segment acquiring request according to the acquired storage address of the media file segment, which corresponds to the identifier identical with the identifier of the user terminal, in the media segment description file.

3. The method for acquiring media content according to claim 1, wherein before generating, by the user terminal, the file segment acquiring request according to the media segment description file acquired in advance and the identifier of the user terminal, the method comprises receiving, by the user terminal, the media segment description file sent by the server, wherein the media segment description file is generated according to a storage address and an embedded identifier of each media file segment after the server divides the media content into one or more media segments, embeds identifiers corresponding to different user terminals into each media segment to form multiple media file segments corresponding to each media segment, and stores the formed media file segments.

4. The method for acquiring media content according to claim 1, wherein the server is a media server, and wherein before generating, by the user terminal, the file segment acquiring request according to the media segment description file acquired in advance and the identifier of the user terminal, the method comprises receiving, by the user terminal, the media segment description file sent by a central server, wherein the media segment description file is generated by the central server according to a storage address and an embedded identifier of each media file segment that are sent by the media server after the media server divides the media content into one or more media segments, embeds identifiers corresponding to different user terminals into each media segment to form multiple media file segments corresponding to each media segment, and stores the formed media file segments.

5. The method for acquiring media content according to claim 1, wherein before generating, by the user terminal, the file segment acquiring request according to the media segment description file acquired in advance and the identifier of the user terminal, the method comprises: sending, by the user terminal, a registration request to the server; and receiving, by the user terminal, an identifier that is generated according to the registration request and returned to the user terminal by the server.

6. A server, comprising:
a non-transitory computer readable medium having instructions stored thereon; and
a computer processor coupled to the non-transitory computer readable medium and configured to execute the instructions to:
receive a file segment acquiring request sent by a user terminal, wherein the file segment acquiring request is generated and sent by the user terminal according to an identifier of the user terminal and a media segment description file that is acquired in advance, and the media segment description file comprises a storage address and an embedded identifier of each media file segment that is divided from media content;

provide the user terminal with the media file segment that corresponds to the file segment acquiring request and is embedded with the identifier of the user terminal;

divide the media content into one or more media segments;

embed identifiers corresponding to different user terminals into each divided media segment to form multiple media file segments corresponding to each media segment;

store the formed media file segments;

generate the media segment description file according to the storages address of each of the media file segments and the identifier embedded into each of the media file segments;

send the media segment description the to the user terminal, so that the user terminal acquires the media segment description file in advance; and embed an identifier segment split from the identifier of a same user terminal into each media segment corresponding to the same terminal to form multiple media file segments corresponding to the same user terminal.

7. The server according to claim 6, wherein the server is a media server.

8. The server according to claim 6, wherein the computer processor is further configured to execute the instructions to embed an identifier corresponding to a same user terminal into all the media segments corresponding to the same user terminal to form multiple media file segments corresponding to the same user terminal.

9. The server according to claim 6, wherein the computer processor is further configured to execute the instructions to:
receive registration requests of the different user terminals;
generate identifiers corresponding to the different user terminals; and
send the generated identifiers to corresponding user terminals.

10. The server according to claim 9, wherein the computer processor is further configured to execute the instructions to generate the identifiers corresponding to the different user terminals by using a random number generation method.

11. A user terminal, comprising:
a non-transitory computer readable medium having instructions stored thereon; and
a computer processor coupled to the non-transitory computer readable medium and configured to execute the instructions to:
generate, according to a media segment description file acquired in advance and an identifier of the user terminal, a file segment acquiring request, wherein the media segment description file comprises a storage address and an embedded identifier of each media file segment that is divided from media content;

send the file segment acquiring request to a server to request acquiring of the media file segment corresponding to the file segment acquiring request;

acquire, from the server, the media file segment that corresponds to the file segment acquiring request and is embedded with the identifier of the user terminal;

split the identifier of the user terminal into multiple identifier segments;

match the identifier segments with an identifier embedded into each of the media file segments in the media segment description file;

acquire storage addresses of media file segments, which correspond to identifiers identical with the identifier segments, in the media segment description file; and generate the file segment acquiring request according to the acquired storage addresses of the media file segments, which correspond to the identifiers identical with the identifier segments, in the media segment description file.

12. The user terminal according to claim 11, wherein the computer processor is further configured to execute the instructions to receive the media segment description file sent by the server, wherein the media segment description file is generated according to a storage address and an embedded identifier of each media file segment after the server divides the media content into one or more media segments, embeds identifiers corresponding to different user terminals into each media segment to form multiple media file segments corresponding to each media segment, and stores the formed media segments.

13. The user terminal according to claim 11, wherein the server is a media server, and wherein the computer processor is further configured to execute the instructions to receive the media segment description file sent by a central server, wherein the media segment description file is generated by the central server according to a storage address and an embedded identifier of each media file segment that are sent by the media server after the media server divides the media content into one or more media segments, embeds identifiers corresponding to different user terminals into each media segment to form multiple media file segments corresponding to each media segment, and stores the formed media file segments.

14. The user terminal according to claim 11, wherein the computer processor is further configured to execute the instructions to:

send a registration request to the server; and receive an identifier that is generated according to the registration request and returned to the user terminal by the server.

* * * * *

UNITED STATES PATENT AND TRADEMARK OFFICE
CERTIFICATE OF CORRECTION

PATENT NO. : 9,633,029 B2
APPLICATION NO. : 14/311631
DATED : April 25, 2017
INVENTOR(S) : Shiguo Lian et al.

It is certified that error appears in the above-identified patent and that said Letters Patent is hereby corrected as shown below:

On the Title Page

Page 2, References Cited, Other Publications Section should read:

LIAN, S., et al., "Collusion-Traceable Secure Multimedia Distribution Based on Controllable Modulation," IEEE Transactions on Circuits and Systems for Video Technology, Vol. 18, No. 10, October 2008, pages 1462-1467.

In the Claims

Column 22, Line 19, Claim 6 should read:

send the media segment description file to the user terminal, so that the user terminal acquires the media segment description file in advance; and Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*